United States Patent [19]

Sirkoch et al.

[11] Patent Number: 4,745,003

[45] Date of Patent: May 17, 1988

[54] METHOD FOR IMPROVING DURABILITY OF MIRRORS UTILIZING RADIATION CURABLE COATINGS

[75] Inventors: Robert J. Sirkoch, Pittsburgh; Ken W. Niederst, Allison Park; Alan B. Weissberg, Pittsburgh; Paul P. Greigger, Allison Park; Calvin C. Henning, Upper St. Clair, all of Pa.

[73] Assignee: PPG Industries, Inc., Pittsburgh, Pa.

[21] Appl. No.: 944,777

[22] Filed: Dec. 22, 1986

[51] Int. Cl.[4] ............................................. B05D 3/06
[52] U.S. Cl. .................................... 427/54.1; 427/162
[58] Field of Search ......................... 427/44, 54.1, 162

[56] References Cited

U.S. PATENT DOCUMENTS

| | | | |
|---|---|---|---|
| 4,148,967 | 4/1979 | Satoh et al. | 427/54.1 |
| 4,348,456 | 9/1982 | Imanaka et al. | 428/412 |
| 4,668,558 | 5/1987 | Barber | 427/44 |

*Primary Examiner*—John H. Newsome
*Attorney, Agent, or Firm*—Thomas M. Breininger

[57] ABSTRACT

Disclosed is a method of coating the metal side of a mirror by applying to a reflective layer of metal adhered to a transparent glass sheet one or more adherent protective layers wherein the outermost protective layer is a cured coating formed from a liquid coating composition which is curable by exposure to ultraviolet light (UV). The UV curable liquid coating composition has a high degree of resistance to shrinkage upon curing.

20 Claims, No Drawings

METHOD FOR IMPROVING DURABILITY OF MIRRORS UTILIZING RADIATION CURABLE COATINGS

BACKGROUND OF THE INVENTION

The present invention is directed to a coating process used in manufacturing a mirror having improved quality and durability. The process of depositing thin layers of reflective metal such as silver and/or copper on transparent glass sheets to make mirrors is well known. The thin layer of metal, if not protected from the environment, will rapidly deteriorate. It is known to coat the metal side of the mirror with an opaque protective coating. However, while providing a good measure of protection on the metallic layer from corrosive elements in the environment, the metal layer often nevertheless corrodes, most often beginning at the edge of the mirror where it has been cut to a predetermined shape. Failure also can occur where the protective coating has been marred or abraded during shipping and handling of the mirror. Additionally, the protective coating on a mirror, often referred to as a "mirror back coating" or simply "mirror backing," should be able to harden or cure quickly to a sufficient degree to allow rapid manufacture of the coated mirror without the protective coating suffering from poor resistance to handling. The composition also should cure so as to provide good fabrication properties as required for edge grinding and for clean cutting and breaking.

A problem with conventional mirrors having thereon a conventional opaque, pigmented mirror back coating is that the mirror back coating tends not to have a desirable degree of abrasion resistance, stain resistance, chemical resistance and scratch resistance. However, applying an unpigmented clear coating over the opaque coating typically, while improving some of these properties with respect to the central portion of the coated surface, most often tends to induce failure at the edges of the mirror coating as evidenced by delamination of the entire coating from the edge of the mirror and thereby exposing the mirror to severe failure.

The present invention is directed to providing mirrors having a protective coating which provides excellent durability properties such as chemical resistance, solvent resistance, abrasion resistance as well as excellent fabrication and handling properties. Other objects of the invention will become apparent to the reader infra.

SUMMARY OF THE INVENTION

The present invention is for a method of coating the metal side of a mirror comprising applying to a reflective layer of metal adhered to a transparent glass sheet one or more adherent protective layers wherein the outermost protective layer is a cured coating formed from a liquid coating composition which is curable by exposure to ultraviolet light (UV). It is been discovered that it is important to the method of the invention that the UV curable liquid coating composition have a high degree of resistance to shrinkage upon curing. It is important that the UV curable liquid coating composition not exhibit a "Percent Shrinkage" of 10 percent or more as defined below. A UV curable coating composition suitable for the method of the present invention will exhibit a film shrinkage for the cured coating of less than 10 percent upon curing as calculated from the following formula:

$$(D_1-D_2)/D_1 \times 100 = \text{Percent Shrinkage,}$$

wherein
$D_1$ is the density of the liquid coating composition, and
$D_2$ is the density of the cured coating.

UV curable coating compositions suitable for the method of the invention ordinarily are free of ultraviolet light absorbing pigments which can interfere with the desired curing properties of the composition.

The present invention also is for a mirror produced by the method of the invention.

DETAILED DESCRIPTION OF THE INVENTION

The method of coating a mirror according to the invention comprises: applying a reflective layer of metal adhered to a transparent glass sheet one or more protective layers wherein the outermost protective layer is a cured coating formed by exposing to ultraviolet light a liquid coating composition comprising an organic resin which is curable by ultraviolet light and which exhibits a film shrinkage for the cured coating of less than 10 percent upon curing as calculated from the following formula:

$$(D_1-D_2)/D_1 \times 100 = \text{Percent Shrinkage,}$$

wherein
$D_1$ is the density of the liquid coating composition, and
$D_2$ is the density of the cured coating.

A test for determining the percent shrinkage as used in the preceding formula is set forth herein immediately before the working examples.

Liquid coating compositions useful in the method of the invention typically contain one or more ethylenically unsaturated monomeric, oligomeric, and/or polymeric compounds capable of being polymerized and/or crosslinked by irradiation with ultraviolet light. For convenience, such monomeric, oligomeric, and/or polymeric compounds will occasionally be referred to herein as "organic resins" or, when referred to in the singular, as "organic resin." It is preferred that the liquid coating composition not exhibit a significant amount of inhibition to curing in air. A wide variety of UV curable, organic resins can be utilized in the method of the invention provided that the choice of resins is made so that the liquid coating composition containing the resin or resins exhibits a film shrinkage upon curing of less than 10 percent. A procedure referred to as a "SHRINKAGE TEST" is set forth below for determining the percent shrinkage of free films from coating compositions suitable for the method of the invention. The procedure differentiates those UV curable coating compositions suitable for the method of the invention from those which are not suitable. Given the above formula and the aforesaid test, one skilled in the art can readily determine whether a UV curable composition is suitable or not for the method of the present invention.

Examples of polymerizable ethylenically unsaturated monomers or oligomers which may be used in the invention include: acrylic and methacrylic esters such as methyl(meth)acrylate, ethyl(meth)acrylate, isopropyl(meth)acrylate, n-butyl(meth)acrylate, isobutyl(meth)a- crylate, 2-ethylhexyl(meth)acrylate, 2-hydroxyethyl(meth)acrylate, glycidyl(meth)acrylate, ethylene glycol di(meth)acrylate, diethylene glycol di(meth)acrylate, tetraethylene glycol di(meth)acrylate, glycerol di(meth)acrylate, glycerol tri(meth)acrylate, 1,3-propylene glycol di(meth)acrylate, dipropylene glycol di(meth)acrylate, 1,4-butanediol di(meth)acrylate, 1,2,4-butanetriol tri(meth)acrylate, 1,6-hexanediol di(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane di(meth)acrylate, trimethylolpropane tri(meth)acrylate, 2,2-dimethyl-3-hydroxypropyl-2,2-dimethyl-3-hydroxypropionate, isobornyl(meth)acrylate and tetrahydrofurfuryl(meth)acrylate; (meth)acrylates derived from aromatic glycidyl ethers such as bisphenol-A-diglycidyl ether and aliphatic glycidyl ethers such as butanediol diglycidyl ether, specific examples of which include 1,4-butanediol diglycidylether di(meth)acrylate, bisphenol-A-diglycidylether di(meth)acrylate and neopentylglycol diglycidylether di(meth)acrylate; acrylic or methacrylic amides such as (meth)acrylamide, diacetone(meth)acrylamide, N(beta-hydroxyethyl)(meth)acrylamide, N,N-bis(beta-hydroxyethyl)-(meth)acrylamide, methylene bis(meth)acrylamide, 1,6-hexamethylene bis(meth)acrylamide, diethylenetriamine tris(meth)acrylamide, bis(gamma-(meth)acrylamidepropoxy)ethane and beta-(meth)acrylamide ethylacrylate; and vinyl monomers such as vinyl acetate, styrene, vinyl toluene and divinyl benzene.

Examples of ethylenically unsaturated oligomers and polymers which may be used in the present invention include ethylenically unsaturated urethane, polyester, polyether, epoxy, and acrylic resins.

Ethylenically unsaturated urethanes may be prepared, for example, by reacting polyols such as simple diols, triols and higher hydric alcohols, polyester polyols, polyether polyols, acryl polyols, epoxypolyols or urethane polyols with polyisocyanates containing ethylenic unsaturation; by reacting the isocyanate groups of urethane resins with unsaturated compounds having active hydrogen atoms such as polymerizable unsaturated carboxylic acids, alcohols, or amines; by reacting hydroxyl groups of urethane polyols with unsaturated carboxylic acids or anhydrides thereof; and by reacting carboxyl groups of urethane resins with ethylenically unsaturated epoxides. For example ethylenically unsaturated urethanes may be prepared from the reaction of an isocyanate with a hydroxyalkyl(meth)acrylate. Illustrative isocyanates include 1,4-tetramethylene diisocyanate, 1,6-hexamethylene diisocyanate, 2,2,4-trimethyl-1,6-diisocyanato hexane, 1,10-decamethylene diisocyanate, 1,4-cyclohexylene diisocyanate, 4,4'-methylene bis(isocyanato cyclohexane), p-phenylene diisocyanate, isophorone diisocyanate, 4,4'-bisphenylene diisocyanate, 4,4'-methylene bis(diphenyl isocyanate), 1,5-naphthalene diisocyanate and 1,5-tetrahydronaphthalene diisocyanate. Examples of hydroxyalkyl acrylates which can be reacted with the isocyanate include 2-hydroxyethyl(meth)acrylate, 2-hydroxypropyl(meth)acrylate, 3-hydroxypropyl(meth)acrylate, trimethylolpropane mono- and di(meth)acrylate and any of the aforedescribed (meth)acrylates which has been modified by reaction with a lactone. Usually, equivalent amounts of the hydroxyalkyl(meth)acrylate and isocyanate are used. Still additional examples of ethylenically unsaturated urethanes include compounds derived from the reaction of a polyurethane having free isocyanato groups with a hydroxyalkyl(meth)acrylate or can be derived from the reaction of a polyurethane having free hydroxyl groups with (meth)acrylic acid. The resultant product is a polyurethane having free isocyanate or free hydroxyl groups depending on the relative amounts of reactants. Those polyurethanes having free isocyanate groups can be reacted with a hydroxyalkyl(meth)acrylate, as described above, while those polyurethanes having free hydroxyl groups can be reacted with (meth)acrylic acid.

Ethylenically unsaturated polyesters ordinarily are esterification products of ethylenically unsaturated carboxylic acids and polyhydric alcohols. Usually the ethylenic unsaturation is in the alpha,beta position with respect to the carbonyl groups. For example, ethylenically unsaturated polyesters can be derived from the reaction of a polycarboxylic acid with a polyhydric alcohol which is further reacted with an acrylic acid. Examples of polycarboxylic acids include: phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid and itaconic acid. Anhydrides of the aforementioned acids, where they exist, are intended to be embraced by the term "acid." Examples of polyhydric alcohols include: ethylene glycol, propylene glycol, diethylene glycol, dipropylene glycol, butylene glycol, glycerol, trimethylolpropane, pentaerythritol, sorbitol, 1,6-hexanediol, 1,4-cyclohexanediol, 1,4-cyclohexanedimethanol, 1,2-bis(hydroxyethyl)cyclohexane, and 2,2-dimethyl-3-hydroxypropyl-2,2-dimethyl-3-hydroxypropionate.

Ethylenically unsaturated polyethers can be prepared by reacting a polyhydric alcohol such as ethylene glycol, polyethylene glycols, propylene glycol, polypropylene glycols, 1,4-butanediol, 1,6-hexanediol, neopentyl glycol, hydroxypivalic acid neopentyl glycol ester, trimethylolpropane, glycerol, pentaerythritol, and the like with various amounts of ethylene oxide and/or propylene oxide and at least partially etherifying the free hydroxyl groups of the product with an ethylenically unsaturated alcohol such as allyl alcohol, methallyl alcohol, crotyl alcohol, or cinnamyl alcohol and/or esterifying the free hydroxyl groups of the aforesaid product with an alpha,beta-ethylenically unsaturated carboxylic acid such as (meth)acrylic acid, crotonic acid, and dicarboxylic acid half esters of monoalkanols, e.g., maleic, fumaric and itaconic half esters of monoalcohols containing 1 to 4 carbon atoms.

Ethylenically unsaturated epoxy resins may be prepared, for example, by reacting epoxy resins with unsaturated carboxylic acids or anhydrides. Examples of epoxy resins include compounds or mixtures of compounds containing more than one 1,2-epoxy group, i.e., polyepoxides. Examples of polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane, 2,2-bis(4-hydroxyphenyl)propane, 1,1-bis(4-hydroxyphenyl)isobutane, 2,2-bis(4-hydroxytertiarybutylphenyl)propane, bis(2-hydroxynaphthyl)methane, 1,5-dihydroxynaphthalene, 1,1-bis(4-hydroxy-3-allylphenyl)ethane, and the hydrogenated derivatives thereof. The polyglycidyl ethers of polyphenols of various molecular weights may be produced, for example, by varying the mole ratio of epichlorohydrin to polyphenol in known manner. Examples of epoxy resins also include: the polyglycidyl ethers of mononuclear polyhydric phenols such as the polyglycidyl ethers of resorcinol, pyrogallol, hydroquinone, and pyrocatechol, as well as the polyglycidyl ethers of polyhydric alcohols such as the reaction products of epichlorohydrin or dichlorohydrin with aliphatic and cycloaliphatic compounds containing from two to four hydroxyl groups such as the polyhydric alcohols set forth above in the description of ethylenically unsaturated polyesters. Examples of unsaturated carboxylic acids or anhydrides for reaction with the epoxy resins include: acrylic acid, methacrylic acid, 2-phenyl acrylic acid, alpha-chloroacrylic acid, and the like.

Ethylenically unsaturated acrylics may be prepared, for example, by reacting hydroxyl groups present in side chains of acrylic polymers with unsaturated mono- or polycarboxylic acids (or anhydrides) or with ethylenically unsaturated epoxides; or by reacting carboxyl groups present in side chains of acrylic polymers with ethylenically unsaturated epoxides.

Ultraviolet radiation (UV) is utilized in the method of the invention to cure the UV curable liquid coating composition. Any suitable source which emits ultraviolet light having a wavelength ranging from about 180 to about 400 nanometers may be employed. Suitable sources of ultraviolet radiation are generally known and include, for example, mercury arcs, carbon arcs, low pressure mercury lamps, medium pressure mercury lamps, high pressure mercury lamps, swirl-flow plasma arcs and ultraviolet light emitting diodes. Preferred are ultraviolet light emitting lamps of the medium pressure mercury vapor type. Such lamps usually have fused quartz envelopes and are ordinarily in the form of long tubes having an electrode at both ends. Typically, preferred medium pressure mercury lamps, usually employed to cure a composition utilized in the method of the invention, have outputs of about 200 or 300 watts per inch across the length of the tube.

Photoinitiators, photosensitizers, or both photoinitiators and photosensitizers often are included in ultraviolet light curable compositions. These materials are generally known in the art. Examples of photosensitizers include benzophenone, anthraquinone, and thioxanthone. Examples of photoinitiators include isobutyl benzoin ether, mixtures of butyl isomers of butyl benzoin ether, alpha,alpha-diethoxyacetophenone, and alpha,alpha-dimethoxy-alpha-phenylacetophenone. Other examples of photoinitiators and photosensitizers can be found in U.S. Pat. No. 4,017,652.

In practicing the method of the invention the liquid, UV curable compositions may be applied to the back of the mirror by any known means, for example, brushing, dipping, roll coating, doctor blade coating, spraying, curtain coating, etc. They may be preliminarily dried to remove solvent if desired and then cured by exposure to ultraviolet radiation. Cure time will vary depending upon the particular formulation, the amount of composition applied to the substrate, etc. The film thickness of the UV cured coating may vary as desired. However, it has been found that provided that the UV curable liquid coating composition exhibits a "Percent Shrinkage" for the cured coating of less than 10 percent upon curing as calculated from the formula above, advantages of the method of the invention can be obtained when the liquid UV curable coating composition is applied to provide a wet film thickness of from about 0.1 mils to about 2 mils, preferably from about 0.5 mils to about 1.5 mils.

In a preferred embodiment of the invention, prior to applying the outermost protective layer of UV curable coating composition, a protective layer of a pigmented, coating composition containing a film-forming material is applied to the reflective layer and hardened to form an opaque coating. The film-forming material for the pigmented, coating composition may comprise any thermoplastic resin and/or thermosetting resin suitable for coating the reflective, metallic layer of the mirror. As used herein, the term "thermosetting resin" is intended to include not only those suitable resins which require heat to effect curing (crosslinking) but also resins which can be crosslinked without the application of heat.

Where there is already an opaque pigmented coating on the mirror, it has been found that it may be desirable to apply the UV curable coating to the opaque coating while the opaque coating is at a temperature of up to about 200 degrees F. (93.3 degrees C.). It has been found that this expedient of applying the UV curable liquid coating to the opaque, pigmented coating while the opaque coating is warm results in improved adhesion of the UV cured outermost coating to the layer of opaque, pigmented coating.

It has been found that the method of the invention can provide coated mirrors which exhibit excellent durability properties such as chemical resistance, solvent resistance and abrasion resistance as well as excellent fabrication and handling properties. For example, it has been found that mirrors produced according to the method of the invention having thereon resultant, transparent, UV cured films according to the invention over an opaque, pigmented coating demonstrated exceptional resistance to a corrosive environment as evidenced through testing according to ASTM B 368-68, the results of which are summarized in TABLE 1 below. It also has been found that mirror back coatings produced according to the method the invention exhibit much better spotting resistance as compared to a conventional mirror back coating.

The examples which follow are submitted for the purpose of further illustrating the nature of the invention and should not be construed as a limitation on the scope thereof.

As used in the body of the specification, examples, and claims, all percents, ratios and parts are by weight unless otherwise specifically indicated.

SHRINKAGE TEST

The following procedure was utilized to determine the percent shrinkage of free films and to differentiate those UV curable coating compositions suitable for the method of the invention from those not suitable. The procedure is as follows.
(1) Obtain a sample of UV curable coating composition sufficient to provide 2.3 grams (g) of free film, and prepare a cured film from the sample.
(2) Prepare in a 1,000 milliliter (ml) beaker a 0.1 percent by weight solution of TRITON X-100 (a nonionic surfactant available from Rohm & Haas Company) in deionized water and place the beaker in a constant temperature bath maintained at 25 degrees C.
(3) Determine the mass of a clean, dry pycnometer.

(4) Fill the pycnometer with TRITON X-100 solution (at 25 degrees C. as described in step 2) until a drop beads on the top when the cap is in place. Wipe the top dry. Determine the mass and temperature of the pycnometer and solution.
(5) Empty the pycnometer; clean and dry it.
(6) Repeat steps (3) through (5) two more times.
(7) Again determine the mass of the clean, dry pycnometer.
(8) Cut up the free film into small pieces (0.6-1.0 g) and place the pieces in the pycnometer. Determine the total mass of the pycnometer and pieces.
(9) Carefully fill the pycnometer with TRITON X-100 solution (at 25 degrees C. as described in step 2). Use a spatula to eliminate entrapped air bubbles from the pieces of free film and pycnometer. Complete the filling of the pycnometer with TRITON X-100 solution, wipe dry, and determine the total mass of the pycnometer containing pieces of film and solution.
(10) Determine the temperature of the solution in the pycnometer; clean and dry the pycnometer; and discard the pieces of free film.
(11) Repeat steps (7) through (10) two more times for each sample.

The "Percent Shrinkage" is calculated as follows.

A. Calculate the average volume of water held by the pycnometer using data obtained in steps (3) through (5) above. Mass of water at 25 degrees C. times 1 ml/0.99707 g = Volume of water.

B. Calculate the volume of water in the samples containing the pieces of free film.
  (1) (Mass of pycnometer + $H_2O$ + film) − (Mass of pycnometer + film) = Mass of water
  (2) Mass of water × 1 ml/0.99707 g = Volume of water in pycnometer with film.

C. Calculate the volume of the film in the pycnometer. (Volume of $H_2O$ in pycnometer) − (Volume of $H_2O$ in pycnometer + film) = Volume of film D. Calculate the density of the film. Mass of film/Volume of film = $D_2$ E. Calculate the density of the liquid coating composition.

$$\frac{\text{Mass/gallon of coating}}{\text{Mass/gallon of H}_2\text{O at 25}^\circ \text{ C. (i.e., 8.31217 lb/gal)}} = D_1$$

F. Calculate the "Percent Shrinkage."

$(D_1 - D_2)/D_1 \times 100 = $ Percent Shrinkage

It will be appreciated by one skilled in the art, that for the purpose of the above calculations, the density of the very dilute TRITON X-100 solution at 25 degrees C. is essentially the same as the density of water at 25 degrees C.

EXAMPLE 1

An ultraviolet light curable coating composition is prepared by mixing the following components:

|  | Parts by Weight |
|---|---|
| EPON 828[1] | 80.0 |
| PCP 0200[2] | 20.0 |
| FC-431[3] | 1.0 |
| UVI-6990[4] | 3.0 |
| | 104.0 |

[1] An epoxy resin having an epoxide equivalent weight of from 185-192 and a viscosity of from 110-150 Poises available as EPON 828 from Shell Chemical Company.
[2] A difunctional polycaprolactone polyol available as PCP 0200 from Union Carbide Corp.
[3] A fluorinated surfactant available from 3M Corporation as FC 431.
[4] An onium salt type photoinitiator available from Union Carbide Corporation as UVI 6990.

EXAMPLE 2

An ultraviolet light curable coating composition is prepared by mixing the following components:

|  | Parts by Weight |
|---|---|
| Bisphenol-A diglycidyl ether diacrylate[1] | 9.13 |
| 2-Phenoxyethyl Acrylate[2] | 3.81 |
| Ethoxy ethoxy ethyl acrylate[3] | 2.29 |
| Phosphatized acrylate[4] | 0.77 |
| Unsaturated polyester resin[5] | 16.00 |
| EPON 1007[6] | 6.40 |
| 2-Phenoxyethyl Acrylate[7] | 9.60 |
| Pentaerythritol triacrylate[8] | 16.00 |
| Isodecyl acrylate[9] | 8.00 |
| Tetrahydrofurfuryl acrylate[10] | 8.00 |
| FC-430[11] | 0.05 |
| Talc[12] | 6.43 |
| Barytes[13] | 8.57 |
| 2,2-Dimethoxy-2-phenylacetophenone[14] | 2.00 |
| Isobutyl benzoin ether[15] | 2.00 |
| Benzophenone[16] | 1.00 |
| | 100.05 |

[1] Available as CELRAD 3700 from Celanese Corporation.
[2] A reactive diluent.
[3] A reactive diluent.
[4] An adhesion promoter available as EBECRYL 19-6170 from Radcure Specialties, Inc. and believed to be a reaction product of hydroxyethyl acrylate and phosphorous pentoxide.
[5] An unsaturated polyester resin at 75 percent by weight solids in 25 percent by weight styrene containing 0.01 percent by weight t-butyl hydroquinone. The polyester resin is prepared from 10 moles of propylene glycol, 3 moles of diethylene glycol, and 10 moles of maleic anhydride employing 0.1 percent by weight triphenyl phosphite and 0.01 percent by weight t-butyl hydroquinone.
[6] An epoxy resin having an epoxide equivalent weight of from 2000-2500 and a Gardner Holdt viscosity of from Y-$Z_1$ available from Shell Chemical Company.
[7] A reactive diluent. Note: This component is premixed with the EPON 1007 before admixing with the other components.
[8] A reactive diluent.
[9] A reactive diluent.
[10] A reactive diluent.
[11] A fluorinated surfactant available from 3M Corporation as FC 430.
[12] A UV transparent filler available as MISTRON RCS from Cyprus Minerals Co.
[13] A UV transparent pigment available as 290 Lo Micron Barytes from Whittaker, Clark & Daniels.
[14] A photoinitiator available as IRGACURE 651 from Ciba Geigy Corp.
[15] A photoinitiator.
[16] A photosensitizer.

EXAMPLE 3

An ultraviolet light curable coating composition is prepared by mixing the following components:

|  | Parts by Weight |
|---|---|
| Urethane acrylate resin[1] | 69.93 |
| N—Vinyl pyrollidone[2] | 11.11 |
| Cellosolve Acetate Butyrate[3] | 1.77 |
| Wax[4] | 0.98 |
| 1,6-Hexane diol diacrylate[5] | 6.12 |
| Antifoaming agent[6] | 0.67 |
| Silica[7] | 4.19 |
| 2,2-Dimethoxy-2-phenylacetophenone[8] | 1.27 |
| Benzophenone[9] | 3.96 |

-continued

|   | Parts by Weight |
|---|---|
|   | 100.00 |

[1] A urethane acrylate resin at 48 percent by weight solids prepared from 43.54 percent by weight methylene bis(4-isocyanato cyclohexane), 34.82 percent by weight of a difunctional polycaprolactone polyol available as PCP 0200 from Union Carbide Corp., 13.93 percent by weight hydroxyethyl acrylate and 7.71 percent by weight of an amide diol (a 100 percent by weight solids reaction product of 1.0 mole of N—methyl ethanolamine and 1.0 mole of butyrolactone) in a 52 percent by weight solvent composition containing 45.84 percent by weight 2-phenoxyethyl acrylate, 30.86 percent by weight 2-ethylhexyl acrylate and 23.30 percent by weight 1,6-hexanediol diacrylate.
[2] A reactive diluent.
[3] A resinous additive available from Eastman Chemical Co. as CAB-551-0.2.
[4] A hydrocarbon wax available as S-379N from Shamrock Chemical.
[5] A reactive diluent.
[6] Available as Anti Foam 2301 from Nalco Chemical.
[7] A silica pigment available as SYLOID 74X4500 from W. R. Grace Company.
[8] A photoinitiator available as IRGACURE 651 from Ciba Geigy Corp.
[9] A photosensitizer.

EXAMPLE 4

An ultraviolet light curable coating composition is prepared by mixing the following components:

|   | Parts by Weight |
|---|---|
| Urethane acrylate resin[1] | 45.09 |
| 1,6-Hexanediol diacrylate[2] | 34.80 |
| N—Vinyl P[3] | 2.83 |
| Silica[4] | 7.29 |
| Wax[5] | 1.94 |
| Antisettling agent[6] | 1.05 |
| Antifoaming agent[7] | 0.68 |
| Benzophenone[8] | 4.86 |
| Hydroxyalkylphenone photoinitiator[9] | 1.46 |
|   | 100.00 |

[1] A urethane acrylate resin at 90 percent by weight solids prepared from 45.56 percent by weight Polyg G55-173 (a polypropylene glycol/ethylene oxide adduct available from Olin Chemical Corp.), 34.85 percent by weight isophorone diisocyanate, 18.21 percent by weight hydroxyethyl acrylate and 1.38 percent by weight of an amide diol (a 100 percent by weight solids reaction product of 1.0 mole of N—methyl ethanolamine and 1.0 mole of butyrolactone) in 10 percent by 1,6-hexanediol diacrylate (diluent).
[2] A reactive diluent.
[3] A reactive diluent.
[4] A silica pigment available as SYLOID 74X4500 from W. R. Grace Company.
[5] A hydrocarbon wax available as S-379N from Shamrock Chemical.
[6] Antisettling agent available as Suspeno ® 200-X from Poly-Resyn, Inc.
[7] Available as Anti Foam 2301 from Nalco Chemical.
[8] A photosensitizer.
[9] Available as EM-1173 from E. M. Chemicals.

EXAMPLE 5

An ultraviolet light curable coating composition is prepared by mixing the following components:

|   | Parts by Weight |
|---|---|
| Coating Composition of EXAMPLE 3[1] | 85.00 |
| 1,6-Hexanediol diacrylate[2] | 15.00 |
| 2,2-Dimethoxy-2-phenylacetophenone[3] | 0.15 |
| Benzophenone[4] | 0.60 |
|   | 100.75 |

[1] As described in EXAMPLE 3.
[2] A reactive diluent.
[3] A photoinitiator available as IRGACURE 651 from Ciba Geigy Corp.
[4] A photosensitizer.

EXAMPLE 6

An ultraviolet light curable coating composition is prepared by mixing the following components:

|   | Parts by Weight |
|---|---|
| Urethane acrylate resin[1] | 19.14 |

-continued

|   | Parts by Weight |
|---|---|
| Urethane acrylate resin[2] | 27.21 |
| Bisphenol-A diglycidyl ether diacrylate[3] | 4.53 |
| 1,6-Hexanediol diacrylate[4] | 16.13 |
| 2-Ethylhexyl acrylate[5] | 14.11 |
| Tetraethyleneglycol diacrylate[6] | 4.53 |
| Antisettling agent[7] | 1.01 |
| Wax[8] | 1.01 |
| Defoaming agent[9] | 0.71 |
| Flatting agent[10] | 2.89 |
| Cellosolve Acetate Butyrate[11] | 3.50 |
| Benzophenone[12] | 4.02 |
| 2,2-Dimethoxy-2-phenylacetophenone[13] | 1.21 |
|   | 100.05 |

[1] A urethane acrylate resin at 48 percent by weight solids prepared from 43.54 percent by weight methylene bis(4-isocyanato cyclohexane), 34.82 percent by weight of a difunctional polycaprolactone polyol available as PCP 0200 from Union Carbide Corp., 13.93 percent by weight hydroxyethyl acrylate and 7.71 percent by weight of an amide diol (a 100 percent by weight solids reaction product of 1.0 mole of N—methyl ethanolamine and 1.0 mole of butyrolactone) in a 52 percent by weight solvent composition containing 45.84 percent by weight 2-phenoxyethyl acrylate, 30.86 percent by weight 2-ethylhexyl acrylate and 23.30 percent by weight 1,6-hexanediol diacrylate.
[2] A urethane acrylate resin at 90 percent by weight solids prepared from 45.56 percent by weight Polyg G55-173 (a polypropylene glycol/ethylene oxide adduct available from Olin Chemical Corp.), 34.85 percent by weight isophorone diisocyanate, 18.21 percent by weight hydroxyethyl acrylate and 1.38 percent by weight of an amide diol (a 100 percent by weight solids reaction product of 1.0 mole of N—methyl ethanolamine and 1.0 mole of butyrolactone) in 10 percent by 1,6-hexanediol diacrylate (diluent).
[3] Available as CELRAD 3700 from Celanese Corporation.
[4] A reactive diluent.
[5] A reactive diluent.
[6] A reactive diluent.
[7] Antisettling agent available as Suspeno ® 200-X from Poly-Resyn, Inc.
[8] A hydrocarbon wax available as S-379N from Shamrock Chemical.
[9] Available as L-475 Defoamer from Drew Chemical Company.
[10] A UV transparent silica pigment available as O.K. 412 from Degussa, Inc.
[11] A resinous additive available from Eastman Chemical Co. as CAB-551-0.2.
[12] A photosensitizer.
[13] A photoinitiator available as IRGACURE 651 from Ciba Geigy Corp.

EXAMPLES 7-12

These examples illustrate the application, UV (ultraviolet) curing and resultant properties for coating compositions of Examples 1-6.

(a) Six commercially available silver/copper mirrors, the metal (back) sides of which had adhered thereto a hardened, pigmented, gray opaque, alkyd/phenolic/melamine mirror coating available commercially from PPG Industries, Inc. as UC57311. The mirrors were warmed in an oven to a surface temperature of 150-190 degrees Fahrenheit (65.6-87.8 degrees Celsius) at which temperature the UV curable coating compositions were applied to the back sides of the mirrors using a roll coater to provide wet films having a thickness of about 1.0 mils (about $2.5 \times 10^{-5}$ meters). Each of the resultant wet films was cured in air by passing the film at a rate of 40 feet/minute (12.2 meters/minute) beneath four 200 watt/inch medium pressure mercury vapor lamps suspended four inches above the film. The resultant, clear films had a dry film thickness of about 0.5 mils (about $1 \times 10^{-5}$ meters).

(b) Each of the UV curable coating compositions of Examples 1-6 was analyzed for Percent Shrinkage according to the "Shrinkage Test" described above. The results are as set forth in the following TABLE 1.

(C) The mirrors having thereon the resultant, transparent, UV cured films as described in part (a) immediately above were tested for resistance to corrosive environments as follows. The test is according to ASTM B 368-68 and consists of exposing the coated mirrors with freshly cut edges to a fog containing copper chloride, acetic acid and sodium chloride. The temperature of the fog is 120° F. (48.9° C.) and the coated mirrors are exposed to the fog for 120 hours. Thereafter, the coated mirrors are rated for spotting of the reflective layer and for delamination as measured in millimeters from the edge of the mirror (also referred to as "edge undercutting"). The results are as set forth in TABLE 1 below.

As can be seen from the results summarized in TABLE 1, the mirrors prepared from the UV curable coating compositions which demonstrated more than 12 percent shrinkage for their free films (Comparative Examples 2 and 4) exhibited severe failure and delamination.

TABLE 1

| Cured Coating | Percent Shrinkage | Edge Undercutting (mm) | Spotting |
|---|---|---|---|
| Example 1 | −3.3%* | 0.5 mm | none |
| Example 2 | 17.0% | 4.0 mm** | none |
| Example 3 | 9.3% | 1.7 mm | none |
| Example 4 | 12.8% | 9.0 mm** | none |
| Example 5 | 9.9% | 0.8 mm | none |
| Example 6 | 9.6% | 2.0 mm | none |

*The negative value is believed to be due to a very small amount of air that was observed to be between some pieces of film used in the sample.
**Both the cured clear coating and the opaque undercoat were severely curled and lifted from the edges.

EXAMPLE 13

This example illustrates the improved acid resistance of mirrors coated according to the method of the invention compared to a mirror not coated according to the invention.

(a) A drop of each of the four acidic solutions as set forth in the following TABLE 2 was placed on the back side (coated side) of mirrors coated according to part (a) of Examples 7–12 with ultraviolet light curable coating compositions as described in Examples 3 and 6, and the drop was covered with a watch glass and allowed to remain on the coating for 24 hours. Next, the acidic solutions were rinsed from the coatings with deionized water and the mirror back coatings were placed in a 20 percent salt spray for 24 hours (according to the method of DDM-411B, Federal Specification). The reflective layers were checked visually for deterioration as evidenced by a darkening in the reflective layer. This test was also conducted on the back side of a control mirror, that is one having thereon only the hardened gray opaque mirror coating as described in part (a) of Examples 7–12. The results are as summarized in the following TABLE 2. The terms in the table "none," "slight," "moderate," and "severe" refer to the visually determined amount of deterioration in the reflective layer.

TABLE 2

| | Solution 1[1] | Solution 2[2] | Solution 3[3] | Solution 4[4] |
|---|---|---|---|---|
| Example 3 | none | none | none | none |
| Example 6 | none | none | none | none |
| Control | slight | severe | moderate | moderate |

[1] A 20 percent by weight aqueous solution of ferric chloride.
[2] A 10 percent by weight aqueous solution of hydrogen chloride.
[3] A 5 percent by weight aqueous solution of hydrogen chloride.
[4] A 1 percent by weight aqueous solution of hydrogen chloride.

What is claimed is:

1. A method of coating a mirror comprising: applying to a reflective layer of metal adhered to a transparent glass sheet a protective layer of a coating composition comprising a film-forming material and pigment particles which hardens to an opaque coating, and thereafter applying to said opaque coating, one or more protective layers wherein the outermost protective layer is a cured coating formed by exposing to ultraviolet light a liquid coating composition comprising an organic resin which is curable by ultraviolet light and which exhibits a film shrinkage for the cured coating of less than 10 percent upon curing as calculated from the following formula:

$$(D_1 - D_2)/D_1 \times 100 = \text{Percent Shrinkage.}$$

wherein
$D_1$ is the density of said liquid coating composition, and
$D_2$ is the density of the cured coating.

2. The method of claim 1 wherein said coating composition additionally comprises a photoinitiator and/or a photosensitizer.

3. The method of claim 1 wherein said cured coating is transparent.

4. The method of claim 1 wherein said liquid coating composition is exposed to ultraviolet light in ambient air.

5. The method of claim 1 additionally comprising a step of heating said coating composition comprising a film-forming material and pigment particles prior to exposing to ultraviolet light said liquid coating composition comprising said organic resin which is curable by ultraviolet light.

6. A mirror manufactured by the method of claim 1.
7. A mirror manufactured by the method of claim 2.
8. A mirror manufactured by the method of claim 3.
9. A mirror manufactured by the method of claim 4.
10. A mirror manufactured by the method of claim 5.

11. A method of manufacturing a mirror comprising: applying a reflective layer of metal to a transparent glass sheet and applying to said reflective layer a protective layer of a coating composition comprising a film-forming material and pigment particles which hardens to an opaque coating, and thereafter applying to said opaque coating, one or more protective layers provided that the outermost protective layer is a cured coating formed by exposing to ultraviolet light a liquid coating composition comprising an organic resin which is curable by ultraviolet light and which exhibits a film shrinkage for the cured coating of less than 10 percent upon curing as calculated from the following formula $$(D_1 - D_2)/D_1 \times 100 = \text{percent shrinkage,}$$

wherein
$D_1$ is the density of said liquid coating composition, and
$D_2$ is the density of the cured coating.

12. The method of claim 11 wherein said coating composition additionally comprises a photoinitiator and/or a photosensitizer.

13. The method of claim 11 wherein said cured coating is transparent.

14. The method of claim 11 wherein said liquid coating composition is exposed to ultraviolet light in ambient air.

15. The method of claim 11 additionally comprising a step of heating said coating composition comprising a film-forming material and pigment particles prior to exposing an ultraviolet light said liquid coating composition comprising said organic resin which is curable by ultraviolet light.

16. A mirror manufactured by the method of claim 11.
17. A mirror manufactured by the method of claim 12.
18. A mirror manufactured by the method of claim 13.
19. A mirror manufactured by the method of claim 14.
20. A mirror manufactured by the method of claim 15.

* * * * *